March 20, 1928.
C. B. COMSTOCK
BAKER'S OVEN
Filed Feb. 16, 1926
1,663,117
4 Sheets-Sheet 1
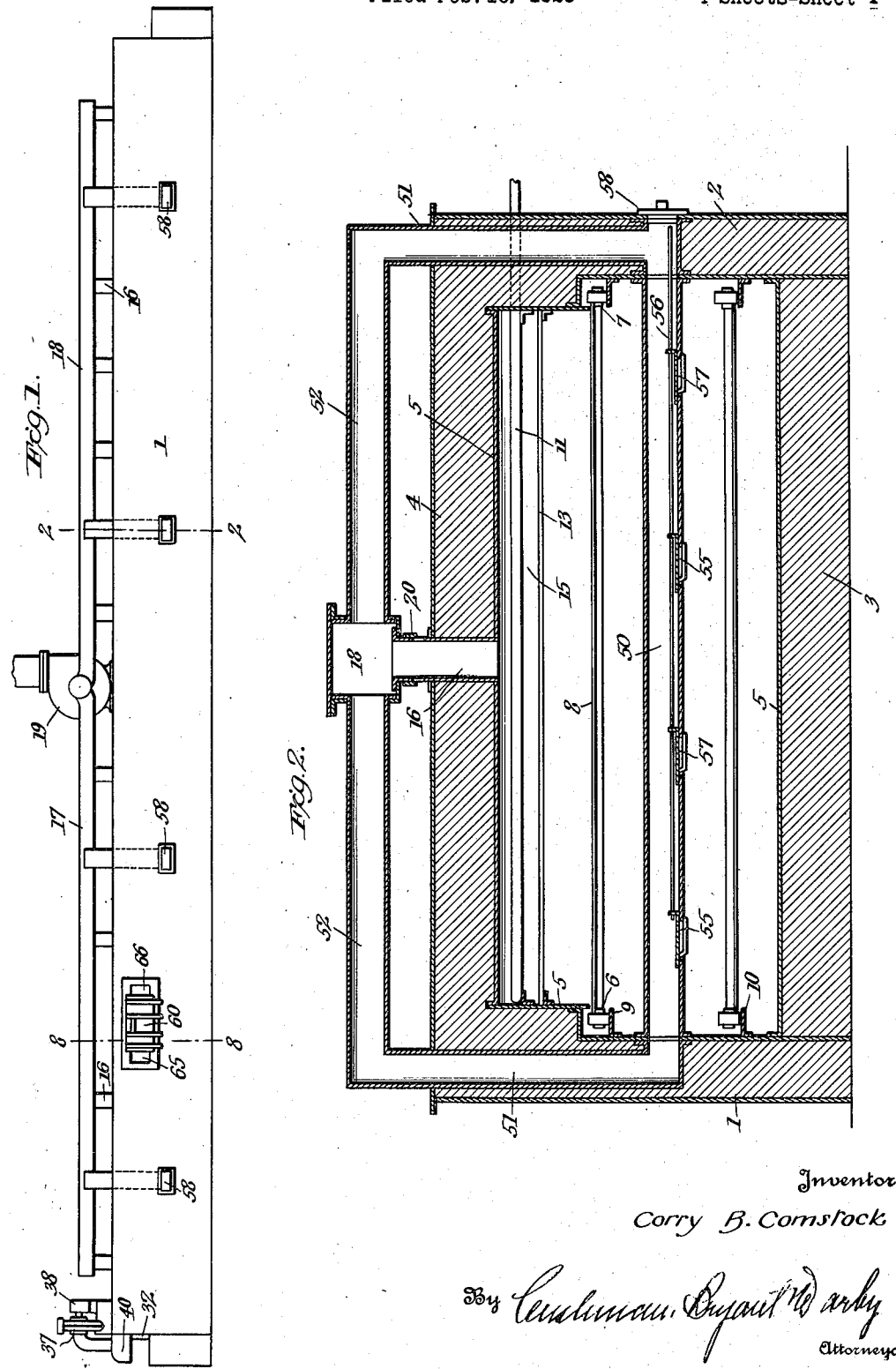
Inventor
Corry B. Comstock March 20, 1928. 1,663,117
C. B. COMSTOCK
BAKER'S OVEN
Filed Feb. 16, 1926 4 Sheets-Sheet 2
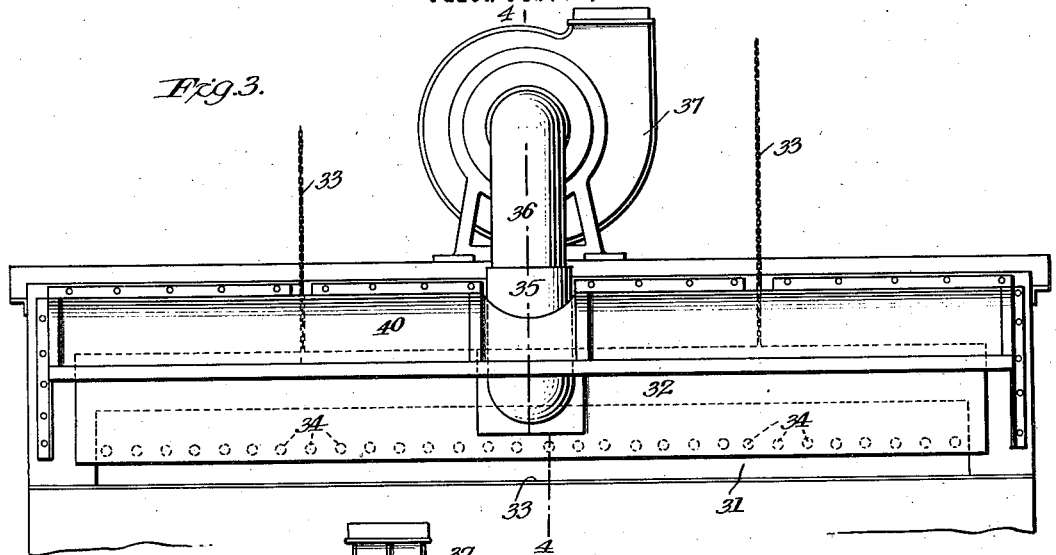
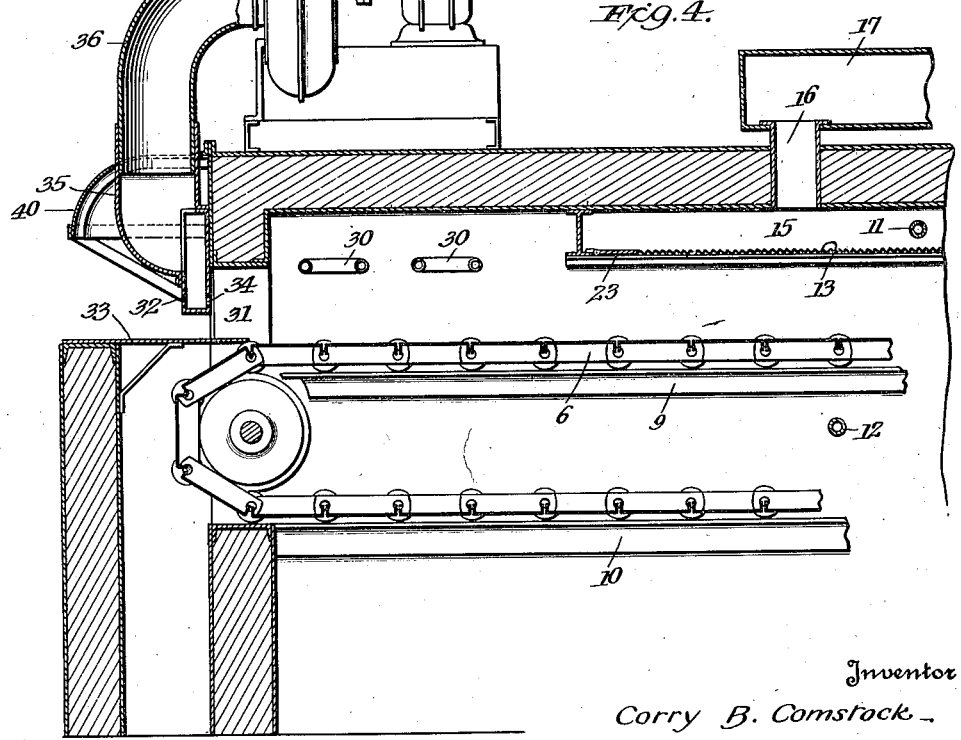
Inventor
Corry B. Comstock
By Cushman, Bryant & Darby
Attorneys March 20, 1928. 1,663,117
C. B. COMSTOCK
BAKER'S OVEN
Filed Feb. 16, 1926 4 Sheets-Sheet 3
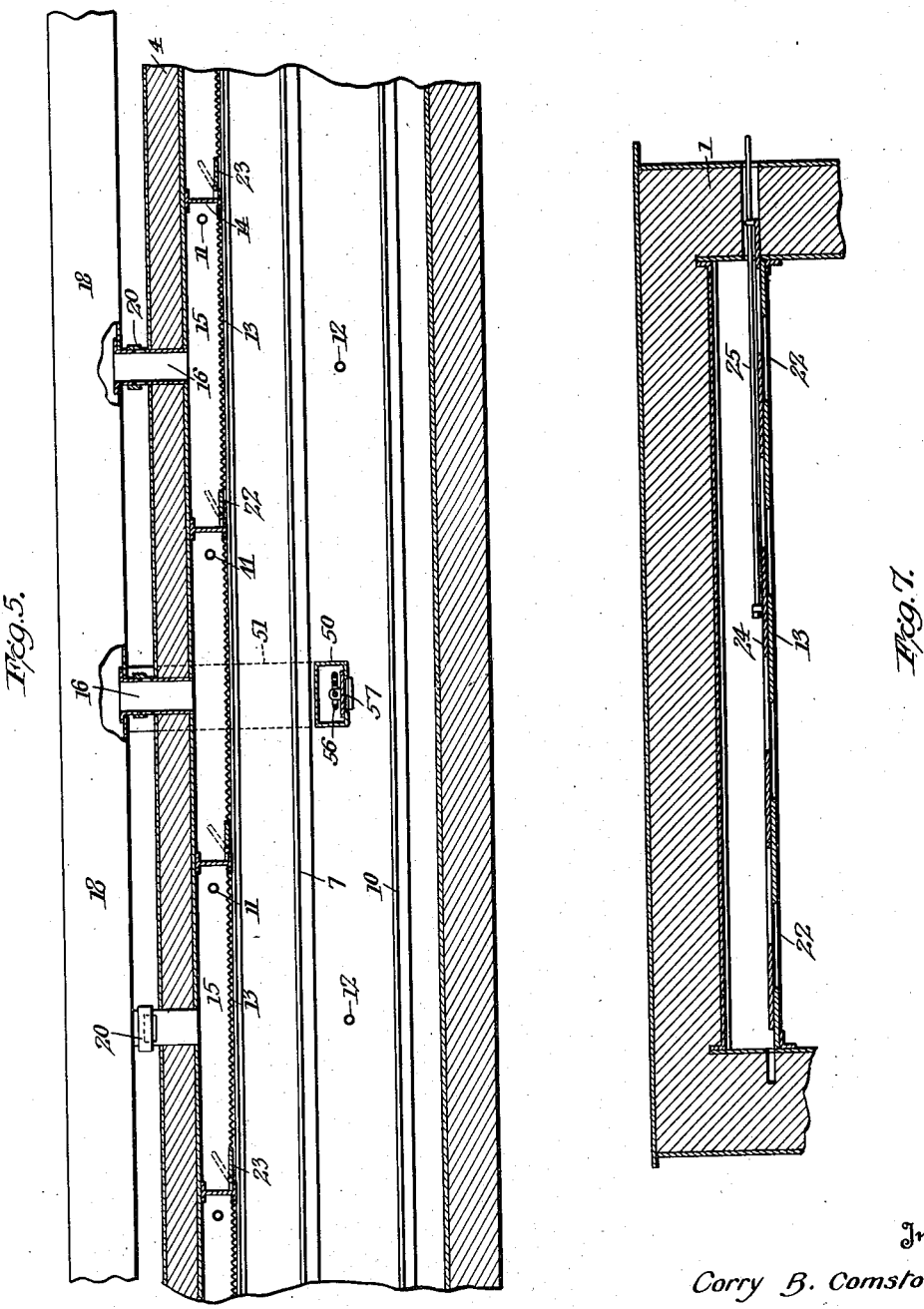
Inventor
Corry B. Comstock March 20, 1928. 1,663,117
C. B. COMSTOCK
BAKER'S OVEN
Filed Feb. 16, 1926     4 Sheets-Sheet 4
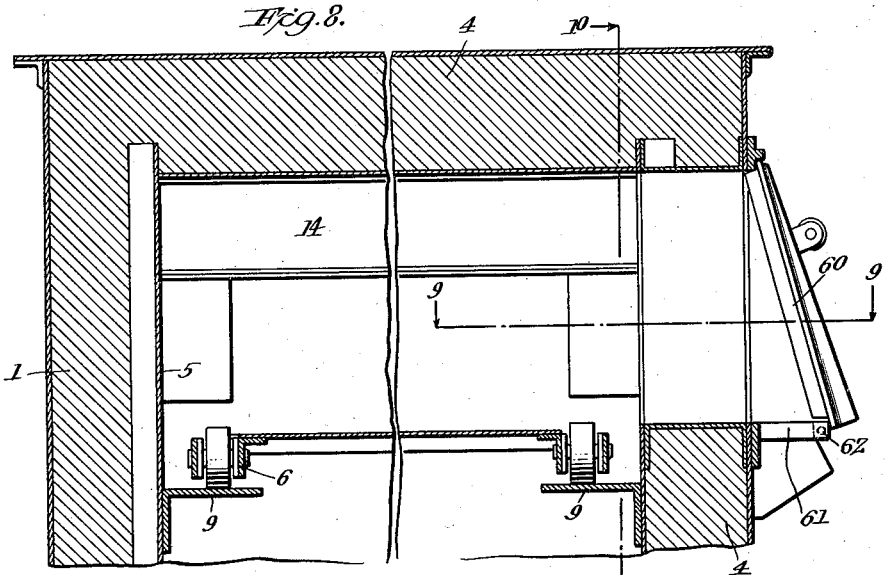
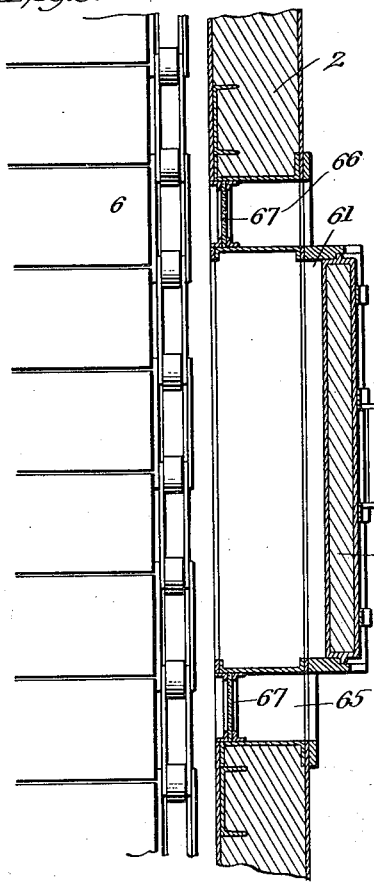
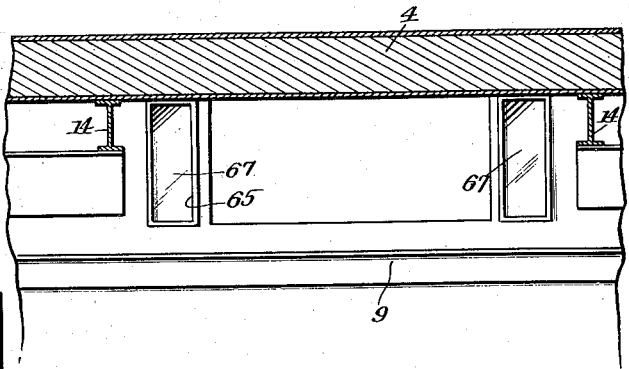
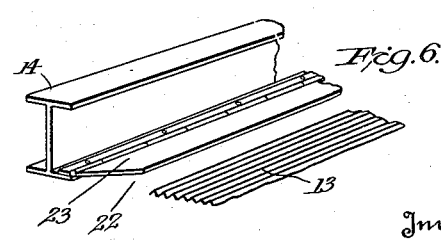
Inventor
Corry B. Comstock
By Cushman, Bryant Darby
Attorneys Patented Mar. 20, 1928.

1,663,117

UNITED STATES PATENT OFFICE.

CORRY B. COMSTOCK, OF NEW YORK, N. Y., ASSIGNOR TO COMSTOCK OVEN COMPANY, INC., OF NEW YORK, N. Y., A CORPORATION OF NEW YORK.

BAKER'S OVEN.

Application filed February 16, 1926. Serial No. 88,611.

The present invention relates to improvements in bakers' ovens of the same general type or class as illustrated in my prior co-pending applications Serial No. 661,064, filed September 5, 1923, and Serial No. 48,310, filed August 4, 1925.

Ovens of the type referred to comprise a suitable casing which is provided with a baking chamber interiorly lined with metal, and through which travels, in a substantially horizontal plane, an endless conveyor, upon which the articles to be baked are supported. Suitable burners are arranged in planes above and below the surface of the conveyor upon which the articles being baked rest, and means are provided whereby the articles being baked are protected from the direct action of the upper series of burners or from being affected by products of combustion of these burners.

Among the objects of the present improvements is the provision of means whereby the oven may be particularly adapted for baking either bread or cake, it being recognized in the art that the best results are obtained by varying the conditions under which the baking is effected when the oven is employed for baking either of such products.

For example, in the baking of bread, it has been found, as pointed out in an earlier application, to be desirable to maintain a body of vapor generated during the baking operation, in contact with the loaves and to maintain a substantially uniform pressure of this vapor throughout the length of the baking chamber.

On the other hand, when baking cake, it is preferable to provide means by which the vapor generated during the baking operation will be practically immediately withdrawn, and the present invention provides a very simple and effective means by which the oven may be readily adapted for either baking cake or bread.

A further object of the invention is to provide a structure which is particularly adapted for baking pies, including means whereby the crusts of "filled pies" may be initially partly baked, and, at an intermediate point in the length of the conveyor by which the pies are carried through the baking zone of the oven, the filling can be supplied to such partially baked crusts, without interrupting the travel of the conveyor, the completely baked pies being discharged at the delivery end of the oven.

Another object of the invention is to provide an improved structure, by means of which steam, commonly sprayed upon loaves immediately adjacent the feed or inlet end of the oven, is uniformly withdrawn from the baking chamber throughout the width of the conveyor.

With the foregoing and other objects in view, the invention resides in the constructions and arrangement of parts that will be hereinafter more particularly described and pointed out in the appended claims, reference being had to the drawings, in which:

Figure 1 is a side elevation of a baker's oven constructed in accordance with the present invention.

Figure 2 is a verical transverse section on an enlarged scale, substantially on the line 2—2 of Figure 1.

Figure 3 is an elevation of the inlet or feed end of the oven.

Figure 4 is a vertical longitudinal section, substantially on the line 4—4 of Figure 3.

Figure 5 is a section substantially on the same line as Figure 4, of an intermediate longitudinal section of the improved oven.

Figure 6 is a detail.

Figure 7 is a transverse section illustrating a slight modification.

Figure 8 is a transverse vertical section on the line 8—8 of Figure 1.

Figure 9 is a plan, partly in section, on the line 9—9 of Figure 8.

Figure 10 is an elevation, partly in section, on the line 10—10 of Figure 8.

Referring to the drawings, in the several figures of which like reference characters designate corresponding parts:

The improved oven comprises an elongated casing having side walls, 1, 2, a bottom 3, and top 4.

As shown, the frame of the casing is formed of angle or channel iron uprights, connected by suitable braces, and a body of refractory or non-heat conducting material, the inner faces of the side, top and bottom wall being covered by metal plates 5.

An endless conveyor formed of parallel roller chains 6, 7, connected by plate-like flights 8, is suitably supported adjacent the ends of the oven casing, and adapted to travel therethrough, with its upper run in a substantially horizontal plane. As shown, the rollers of the endless chains of the conveyor travel along tracks 9, 10, provided by angle iron members suitably secured to opposite side walls of the oven casing.

Two series of fuel burners 11, 12 are provided, said series being, respectively, positioned above and below the horizontal planes of the upper track 9.

Interposed between the upper series of burners 11 and the endless conveyor, is a substantially horizontal partition or baffle, preferably formed of a longitudinally corrugated metal sheet. This baffle or shield extends throughout the length of that portion of the interior of the oven casing within which the burners 11 are arranged, and protects the articles being baked from the direct action of such burners or the products of combustion of such burners coming into contact with the articles during the baking operation.

The horizontal metal partition 13 may be a single continuous sheet throughout its length, or may be formed by a series of shorter corrugated plates, each secured to one of a plurality of eye-bars 14, which depend from the top 4 of the casing and transversely divide the space between said top and the corrugated shield or baffle into a series of relatively independent chambers 15. As shown, one of the upper series of burners 11 is arranged in each of said combustion chambers 15, of which the corrugated metal partition or baffle forms the bottom, and a ventilating duct 16 extends upward from about midway of the length of each combustion chamber to a conduit which is supported above the top of the oven, and extends longitudinally thereof.

The conduit comprises two sections 17, 18, which extend in opposite directions from a fan casing 19 within which is mounted a suitable suction fan by which suction can be created through the several combustion chambers 15 to withdraw the products of combustion of the burners 11. The strength of the draft thus created from each combustion chamber 15 may be regulated by adjustment of a sleeve or collar 20, which surrounds the outlet from the combustion chamber at points between the top of the casing and the longitudinally extending suction conduit, said collar cooperating with an aperture or apertures formed in the wall of the outlet pipe.

Each section of the horizontal, corrugated, baffle or shield 13 is provided with an aperture 22, and adjustable closure means are provided whereby these apertures may be opened or closed as desired.

The partition 13, while conducting the heat of the burners 11 to the space above the endless conveyor, acts, when the apertures 22 therein are closed, to maintain about the articles being baked a body of vapor which is generated during the baking operation. As is well recognized, the presence of such a body of vapor about the top and sides of loaves of bread improves materially the quality of the crust formed during the baking operation, the pressure of such vapor being so regulated by means hereinafter to be described as not to unduly compress the loaves.

In the baking of cake, however, it is important to remove the vapor generated during the baking operation, as it is not desired to form on cake, a crust as is required for bread. Therefore, when the oven is to be used for baking cake, the closures of the apertures 22 in the partition 13, are adjusted to permit the vapor generated in the baking operation to pass through such apertures, and out of the oven through the outlets 16 with the products of combustion of the upper burners 11.

The closures for the apertures 22 may be of any suitable form. As shown in Figures 4 and 5, these closures are in the form of hinged dampers or plates 23, the actuating rods or stems extending to the exterior of the oven and provided with suitable handles, not shown, by which the closures may be adjusted and positioned as desired.

If preferred, each section of the shield or baffle may be provided with a plurality of transversely spaced apertures and a hinged closure arranged to cooperate with each, or, as shown in Figure 7, the closure may be in the form of an apertured slide 24 to which is connected a rod 25 that extends through one of the side walls of the oven casing. It will be evident that by moving the slide 24 by means of the rod 25, the operative area of the openings 22 in the associated section of plate 13, may be varied as desired, or entirely closed.

In baking bread, it has been found advantageous to spray the loaves immediately after their admission into the baking chamber with low pressure steam. The result of this is to form a glaze-like surface upon the loaf of dough which improves the quality of the crust formed by the subsequent action of the heating means.

In Figure 4, 30 designates a plurality of low-pressure steam spraying means which are located between the feed opening at the receiving end of the oven casing, and the first combustion chamber for the upper series of burners 11.

It is, of course, important that any surplus steam not utilized in forming the glaze-like coating upon the loaves, be withdrawn from the baking chamber, as otherwise the amount of moisture in such chamber would be undesirably large.

To effect this removal of the surplus steam without annoyance to the oven attendants, 1 preferably employ the means shown in Figures 1, 3 and 4. The inlet or feed opening 31 at the entrance to the baking chamber is closed by a vertically sliding door 32. This, as shown, is suspended by chains 33 connected with suitable counter-balance weights, not shown, so that it may be readily raised from contact with the feed plate or table 33, to permit the articles to be introduced to the chamber and placed upon the endless conveyor therein.

The body of the door 32 is hollow, and adjacent the lower edge of the rear wall, is provided with a series of apertures 34 extending substantially throughout the width of the endless conveyor. With the tubular or hollow body of the door 32 is connected a tubular elbow 35, the upper end of which telescopically engages a conduit or pipe 36 that is attached to a suction fan casing 37. As shown, this fan housing or casing is mounted upon the top of the oven, and the fan is adapted to be driven by a suitable electric motor conventionally illustrated at 38.

By the construction described, it will be seen that when the fan in the housing 37 is operating, it will create a substantially uniform suction throughout the width of the endless conveyor, whereby any surplus steam from the spray nozzles 30, will be withdrawn from the oven and carried away through the telescoping parts 35, 36. This surplus steam is thus withdrawn from the oven without any danger of causing annoyance to the oven attendants.

When the door is raised, any small amount of steam that may escape beneath the lower-edge thereof will be intercepted by a hood 40 which projects forward form the inlet end of the oven casing and downward about the upper portion of the sliding door, said hood being provided with suitable means for collecting any drip resulting from precipitation of the steam collected therein.

As previously noted, the horizontal partition or baffles 13 act to retain about the articles on the conveyor, a body of vapor generated during the baking operation, and in order that pressure of this vapor may be mantained substantially uniform throughout the baking zone, means are provided whereby it is drawn downward through the baking chamber, and together with the products of combustion from the lower burners, conducted to the exterior of the oven.

For this purpose, the improved oven is provided with a series of ducts 50 which extend transversely across the interior of the oven casing, and the ends of which communicate through upright flues 51 in the side walls 1, 2, and transverse flues 52 with the suction conduits 17 or 18. As shown, the oven is provided with four of these transverse ducts, arranged at substantially equal distances apart throughout the length of the oven casing, although it will be understood that the number of such ducts will, of course, vary with the length of the particular oven to which the invention is applied.

In the lower wall of each of said transverse ducts 50, are provided a plurality of apertures 55 and these are adapted to be opened to any desired extent or completely closed by a damper consisting of a rod 56 and a series of plates or slides 57, one for each of the apertures 55. Access to the ends of the damper actuating rods 56 is had through an opening in the side wall 2 of the oven, which may be closed by a suitable cover plate 58. By adjusting the damper 56, 57, the amount of downward suction through the baking chamber from the fan in the housing 19 may be regulated as desired, and owing to the regular spacing of the outlets 55 transversely of the baking chamber, it will be seen that the pressures therein may be accurately controlled and maintained uniform at all points.

As shown, the rails of the upper track 9 for the endless conveyor are positioned beneath shoulders projecting inward from the side walls of the oven casing, whereby the danger of the articles positioned near the side edges of the conveyor being baked to a greater degree or extent than articles placed nearer the transverse central line of the conveyor, is avoided.

In order that the oven may be particularly adapted for baking pies, I provide in the side wall 4 thereof, an aperture normally closed by a swinging door 60. The lower edge of this aperture is in substantially the same horizontal plane as the flights of the upper run of the endless conveyor, and such aperture is preferably located, as regards length of the oven, in substantial alignment with the second or third of the combustion chambers for the upper series of burners 11. A shelf 61 extends laterally outward from the oven casing in alignment with the bottom of said aperture, and to the ends of this shelf, as at 62, is hinged the door 60.

The purpose of this aperture in the side wall 4 of the oven and the movable closure therefor, is to provide means by which the crust of filled pies may be preliminarily partly baked, and as the conveyor brings such partly baked crusts opposite the aperture referred to, they may be removed from the conveyor, and after being properly filled with the desired "filling", returned to the conveyor and the complete baking finished before the pie reaches the discharge or delivery end of the oven casing. The tins containing the dough for the pie crust of filled pies are introduced through the inlet opening 31, and the aperture controlled by the swinging door 60, is so positioned that this dough will be sufficiently baked by the time the pies come opposite said aperture so that the filling may be properly supplied thereto.

As shown, sight or inspection openings 65, 66 are provided in the side wall 4 at opposite ends of the door 60 therein, and suitable panes of glass 67 are provided at the inner ends of these sight openings through which the attendants may inspect the baking chamber, and ascertain the condition of articles being transported therethrough by the endless conveyor.

It is believed that the operation and advantages of the improvements will be readily understood from the foregoing description in connection with the drawings.

It will be understood that many of the parts are illustrated more or less conventionally, and that except where specifically referred to in the appended claims, the invention is not to be understood as limited to the exact construction shown.

The drawings are to be considered as illustrative rather than restrictive.

I claim:

1. In a baker's oven, the combination of a casing, an endless conveyor mounted to travel substantially horizontally through the casing and support the articles to be baked, means for generating heat to bake articles supported on the conveyor, means for spraying steam upon the articles on the conveyor at points adjacent the receiving end of the casing, a door supported to slide vertically across the feed opening at the receiving end of the casing and provided near its lower edge with a series of steam escape apertures extending substantially throughout the width of the conveyor, a conduit on the exterior of the door and communicating with said apertures, and a fan adapted to draw steam outward from the casing through said apertures and conduit.

2. In a baker's oven, the combination of a casing, an endless conveyor mounted to travel substantially horizontally through the casing and support the articles to be baked, means for generating heat to bake articles supported on the conveyor, means for spraying steam upon the articles on the conveyor at points adjacent the receiving end of the casing, a door supported to slide vertically across the feed opening at the receiving end of the casing and comprising a hollow body, constantly in communication with the interior of the casing, and having a tubular extension, a conduit telescopically engaged with said extension, and means for creating suction through said conduit and door to withdraw the sprayed steam from the casing.

3. In a baker's oven, the combination of a casing, an endless conveyor mounted to travel substantially horizontally through the casing and support the articles to be baked, means for generating heat to bake articles supported on the conveyor, means for spraying steam upon the articles on the conveyor at points adjacent the receiving end of the casing, a door supported to slide vertically across the feed opening at the receiving end of the casing and comprising a hollow body, constantly in communication with the interior of the casing, and having a tubular extension, a conduit telescopically engaged with said extension, and a fan mounted exteriorly of the casing and connected with said conduit to create suction therethrough and through the body of the door, for the purpose described.

4. In a baker's oven, the combination of a casing, an endless conveyor mounted to travel substantially horizontally through the casing and support the articles to be baked, means for generating heat to bake articles on the conveyor, means for spraying steam upon the articles on the conveyor adjacent the receiving end of the casing, a door supported to slide vertically across the outer end of the feed opening at the receiving end of the casing, and means connected with the door and communicating with the interior of the casing for drawing the sprayed steam outward from the casing uniformly throughout the width of the conveyor.

5. In a baker's oven, the combination of a casing, an endless conveyor mounted to travel substantially horizontally through the casing and support the articles to be baked, means for generating heat to bake articles on the conveyor, means for spraying steam upon the articles on the conveyor adjacent the receiving end of the casing, a door supported to slide vertically across the outer end of the feed opening at the receiving end of the casing, and provided on its exterior with a tubular elbow extension that communicates with the interior of the casing at its lower end, and a fan for creating suction outward through said elbow.

6. In a baker's oven, the combination of a casing, an endless conveyor mounted to travel substantially horizontally through the casing and support the articles to be baked, means for generating heat to bake articles on the conveyor, means for spraying steam upon the articles on the conveyor adjacent the receiving end of the casing, a door supported to slide vertically across the outer end of the feed opening at the receiving end of the casing, said door having a tubular extension which communicates with the interior of the casing, a conduit telescopically engaged with the tubular extension on the door, a fan for creating suction outward through the door and conduit, and a hood arranged at the receiving end of the casing and extending outward and downward about the said extension on the door.

7. In a baker's oven, the combination of a casing provided interiorly with a substantially horizontal support for the articles to be baked and provided above said support with a ventilating outlet, a heating burner within the casing above said support, a baffle positioned between the burner and support to protect articles on the support from the direct action of the burner and forming the bottom of a combustion chamber which communicates with said outlet, the baffle having an opening formed therein, and an adjustable closure for said opening whereby if desired, direct communication may be established between the space in the oven below the baffle, and said outlet.

8. In a baker's oven, the combination of a casing provided interiorly with a substantially horizontal support for the articles to be baked and provided in its top with a plurality of outlets spaced one from the other longitudinally of the oven, a plurality of heating burners within the casing above said support, a baffle extending across the casing between each of said burners and the article support to protect articles on the support from the direct action of the burner and forming the bottom of a combustion chamber which communicates with one of the said outlets, each baffle having an opening formed therein, and an adjustable closure for each of said openings in the baffles whereby communication may be established between the space beneath any of the baffles and the outlet above said baffle of cut off, as desired.

9. In a baker's oven, the combination of a casing, an endless conveyor for articles to be baked supported to travel through said casing, two series of burners positioned respectively above and below the upper run of the conveyor, a shield or baffle positioned between the conveyor and the upper series of burners, a plurality of apertured ducts extending transversely between the runs of the conveyor, means for creating suction through said ducts to draw the vapor generated by the baking operation downward and outward from the casing with the products of combustion of the lower burners, independent outlets for the products of combustion of the upper series of burners, and means cooperating with the shield or baffle between the upper burners and the conveyor for permitting more or less of the vapor generated by the baking operation to be withdrawn through the outlets for products of combustion of said upper burners.

10. In a baker's oven, the combination of a casing, an endless conveyor for articles to be baked supported to travel through said casing, a series of burners, spaced longitudinally of the casing, arranged above the conveyor, a partition interposed between the conveyor and said burners and provided with apertures at different points in the length of the casing, means for drawing the vapor generated by the baking operation downward to points beneath the upper run of the conveyor and outward from the casing, independent outlets for the products of combustion of the burners, and adjustable closures for the apertures in said partition whereby more or less of the vapor generated during the baking operation may be withdrawn through said outlets.

11. In a baker's oven, the combination of a casing provided with an interior substantially horizontal support for articles to be baked, a partition extending across the casing above said support, the space between said partition and the top of the casing being divided into a plurality of chambers each having an outlet leading therefrom to the exterior of the oven, a burner within each of said chambers, the horizontal partition being provided with a plurality of apertures each communicating with one of said burner chambers, and an adjustable closure for each of said apertures.

12. In a baker's oven, the combination of a casing provided with an interior substantially horizontal support for articles to be baked, a partition extending across the casing above said support, the space between said partition and the top of the casing being divided into a plurality of chambers each having an outlet leading therefrom to the exterior of the oven, a duct connecting the outer ends of all said outlets, a burner within each of said chambers, the horizontal partition being provided with a plurality of apertures each communicating with one of said burner chambers, and an adjustable closure for each of said apertures.

13. In a baker's oven, the combination of a casing provided with an interior substantially horizontal support for articles to be baked, a partition extending across the casing above said support, the space between said partition and the top of the casing being divided into a plurality of chambers by transverse divisions, an outlet duct leading from each of said chambers and projecting exteriorly from the oven, a conduit connecting the outer ends of all of the outlet ducts, a burner within each of said chambers, the section of each outlet duct between the oven and said conduit having an opening formed in a side wall, and adjustable means for varying the effective area of said opening.

14. In a baker's oven, the combination of a casing provided with an interior substantially horizontal support for articles to be baked, a partition extending across the casing above said support, the space between said partition and the top of the casing being divided into a plurality of chambers by transverse divisions, an outlet duct leading from each of said chambers and projecting exteriorly from the oven, a conduit connecting the outer ends of all of the outlet ducts, a burner within each of said chambers, the section of each outlet duct between the oven and said conduit having an opening formed in a side wall, and a sleeve or collar adjustably mounted on the duct for varying the effective area of said opening.

15. In a baker's oven, the combination of a casing provided with an interior substantially horizontal support for articles to be baked, a partition extending across the casing above said support, the space between said partition and the top of the casing being divided into a plurality of chambers by transverse divisions, an outlet duct leading from each of said chambers to the exterior of the oven, a burner within each of said chambers, the horizontal partition beneath each of said chambers being provided with a plurality of apertures, and an adjustable closure for each of said apertures.

16. In a baker's oven, the combination of a casing provided with an interior substantially horizontal support for articles to be baked, a partition extending across the casing above said support, the space between said partition and the top of the casing being divided into a plurality of chambers by transverse divisions, an outlet duct leading from each of said chambers to the exterior of the oven, a burner within each of said chambers, the horizontal partition beneath each of said chambers being provided with a plurality of apertures, an adjustable closure for each of said apertures, and a common actuator for all of said adjustable closures of each said chambers.

17. In a baker's oven, the combination of a casing having an interior substantially horizontal support for articles to be baked, burners positioned respectively above and below said support, means for shielding the articles on the support from the direct action of the upper burners and normally retaining about said articles a body of vapor generated by the baking operation, means acting to withdraw the products of combustion of the upper burners from the casing, and adjustable means whereby when desired the vapor generated during the baking operation may be directly withdrawn from the oven with the products of combustion of the upper burners.

18. In a baker's oven, the combination of a casing having an interior substantially horizontal support for articles to be baked, burners positioned respectively above and below said support, means for shielding the articles on the support from the direct action of the upper burners, means for drawing the vapor generated during the baking operation downward through the casing and outward with the products of combustion of the lower burners, independent outlets for the products of combustion of the upper burners, and adjustable means whereby more or less of said vapor may be withdrawn through the outlets for the products of combustion of the upper burners.

19. In a baker's oven, the combination of a casing having an interior substantially horizontal support for articles to be baked, burners positioned respectively above and below said support, means for shielding the articles on the support from the direct action of the upper burners, a plurality of ducts extending transversely of the casing below the horizontal plane of the lower burners, and provided within the casing with inlet openings, means for creating suction through said ducts to draw vapor generated during the baking operation downward and outward from the oven, independent outlets for the products of combustion of the upper burners, and adjustable means whereby more or less of the vapor generated during the baking operation can be withdrawn from the oven through said outlets.

20. In a baker's oven, the combination of a casing having an interior substantially horizontal support for articles to be baked, burners positioned respectively above and below said support, means for shielding the articles on the support from the direct action of the upper burners, a plurality of ducts extending transversely of the casing, and each provided within the casing below the horizontal plane of the lower burners with a plurality of inlet openings, means for creating suction through said ducts to draw vapor generated during the baking operation and the products of combustion of the lower burners downward and outward from the oven, and manually adjustable means for varying the area of the inlets of each of said ducts.

21. In a baker's oven, the combination of a casing having an interior substantially horizontal support for articles to be baked, burners positioned respectively above and below said support, means for shielding the articles on the support from the direct action of the upper burners, a plurality of ducts extending transversely of the casing, and each provided in its lower wall within the casing below the horizontal plane of the lower burners with a plurality of inlet openings, means for creating suction through said ducts to draw vapor generated during the baking operation and the products of combustion of the lower burners downward and outward from the oven, and manually adjustable means for varying the area of the inlets of each of said ducts.

22. In a baker's oven, the combination of a casing having an interior substantially horizontal support for articles to be baked, burners positioned respectively above and below said support, means for shielding the articles on the support from the direct action of the upper burners, a plurality of ducts extending transversely of the casing, and each provided within the casing below the horizontal plane of the lower burners with a plurality of inlet openings, means for creating suction through said ducts to draw vapor generated during the baking operation and the products of combustion of the lower burners downward and outward from the oven, a slide adjustable on each duct for controlling flow through each inlet thereof, and manually operable means connecting all of said slides of each duct.

23. In a baker's oven, the combination of a casing, a support for articles to be baked extending longitudinally of the casing, a substantially horizontal partition extending across the interior of the casing above said support, the space above the partition being divided into a plurality of chambers by transverse divisions, a burner within each of said chambers, an outlet for conducting products of combustion from each said chambers to the exterior of the oven, means for drawing vapor generated during the baking operation downward below the surface of the support on which the articles being baked rest and outward from the casing, the partition between the burners and the support being provided with apertures, one communicating with each burner chamber, and an adjustable closure for each said aperture in the partition whereby more or less of the vapor generated during the baking chamber may be withdrawn directly through the outlets for products of combustion from the burners.

24. In a baker's oven, the combination of a casing, a support for articles to be baked extending longitudinally of the casing, a substantially horizontal partition extending across the interior of the casing above said support, a plurality of burners arranged at separated points longitudinally of the casing within the space above said partition, a conduit communicating with the interior of the casing at points below the support for the articles to be baked, means for creating suction through said conduit for drawing vapor generated during the baking operation downward from said support and out from the casing, independent outlets for products of combustion from the burners communicating with said conduit, the partition between the article support and burners being provided with a plurality of apertures, and adjustable means for closing said apertures, whereby when desired, more or less of the vapor generated during the baking operation may be withdrawn through said outlets for products of combustion.

25. In a baker's oven, the combination of a casing, a support for articles to be baked extending longitudinally of the casing, a substantially horizontal partition extending across the interior of the casing above said support, a plurality of burners arranged at separated points longitudinally of the casing within the space above said partition, a plurality of ducts extending transversely of the casing and communicating therewith at points below the support for articles to be baked, a conduit connecting said ducts, means for creating suction through the conduit and ducts for drawing vapor generated during the baking operation downward from the articles and outward through the ducts and conduit, a plurality of pipes connecting the said burner space with said conduit and constituting outlets for the products of combustion of the burners, the partition between the article support and burners being provided with a plurality of apertures, and adjustable means for closing said apertures, whereby when desired more or less of the vapor generated during the baking operation may be withdrawn through said outlets for products of combustion.

26. In a baker's oven, the combination of a casing, a support for articles to be baked extending longitudinally of the casing, a substantially horizontal partition extending across the interior of the casing above said support, a plurality of burners arranged at separated points longitudinally of the casing within the space above said partition, a plurality of ducts extending transversely of the casing and communicating therewith at points below the support for articles to be baked, a conduit connecting said ducts, means for creating suction through the conduit and ducts for drawing vapor generated during the baking operation downward from the articles and outward through the ducts and conduit, a plurality of pipes connecting the said burner space with said conduit and constituting outlets for the products of combustion of the burners, each of said pipes being provided at an intermediate point in its length with a lateral opening adapted to communicate with the atmosphere outside the oven, adjustable means for varying the effective area of or closing said opening, the partition between the article support and burners being provided with a plurality of apertures, and adjustable means for closing said apertures, whereby when desired, more or less of the vapor generated during the baking operation may be withdrawn through said outlets for products of combustion.

In testimony whereof I have hereunto set my hand.

CORRY B. COMSTOCK.